UNITED STATES PATENT OFFICE.

JAMES B. HERRESHOFF, JR., OF NEW YORK, N. Y., ASSIGNOR TO NICHOLS COPPER CO., OF NEW YORK, N. Y., A CORPORATION OF NEW YORK.

BESSEMERIZING COPPER MATTE.

1,103,925.

Specification of Letters Patent.

Patented July 14, 1914.

No Drawing. Application filed August 12, 1912. Serial No. 714,564.

*To all whom it may concern:*

Be it known that I, JAMES B. HERRESHOFF, Jr., a citizen of the United States, and a resident of Richmond Hill, borough of Queens, city and State of New York, have invented a new and useful Improvement in the Process of Bessemerizing Copper Matte, of which the following is a specification.

In obtaining copper from its ores it has been customary first to treat said ores in a blast furnace to obtain copper matte, consisting principally of sulfids of copper and iron, and then treat said matte in a Bessemer converter for the purpose of removing therefrom the sulfur and iron constituents. During the blowing process the iron sulfid, is oxidized to iron oxid and sulfur dioxid gas. The latter escapes from the mouth of the converter while the iron oxid attacks the lining of the converter in the case of an acid-lined converter or the silicious material added to the bath as is always done when the converter is lined with a neutral or basic material. There is thus formed a silicious slag containing iron, which is easily removable from the molten mass of copper bearing material. After the slag thus formed has been removed, the molten mass of copper bearing material, which consists principally of sulfid of copper, and is termed "white metal", is again subjected to a blowing process by which sulfur dioxid is evolved and metallic copper, is produced in the converter. The copper is subsequently treated preferably in a reverberatory furnace for the purpose of further purifying and refining it. This process oxidizes the small amount of sulfur which the copper may contain and also oxidizes some of the copper into copper oxid, which latter attacks the silica lining of the reverberatory furnace and forms a slag containing copper silicate as well as some of the ashes from the firebox of the furnace.

My invention contemplates improvements in the above described process of bessemerizing copper matte by which the above mentioned reverberatory slag is utilized, heat, heretofore wasted, is conserved, and the efficiency of the process is otherwise generally augmented.

The practice of my invention is illustrated by the following specific examples. I wish it be understood, however, that my invention is not necessarily limited to the exact processes set forth but is capable of many variations.

Example I: Using two or more converters, silicious material is introduced into the first converter, molten matte is then poured therein and air is blown through the mass until a clean and fusible slag is formed and part of the iron in the matte is removed. This slag is now poured off and a charge of silicious material is introduced into the converter which is in excess of that required to remove the iron content of the bath. Air is again blown through the mass until the iron has been removed therefrom in the form of slag and "white metal" is produced. The slag and excess silicious material above the white metal is viscous or non fluid. The white metal is now removed from the converter and introduced into the second converter, as for instance by pouring it, from under the slag into the second converter in which it is blown to blister copper in the usual way. The first converter is lined with a basic or neutral lining, which may consist of magnesite bricks, chrome bricks or the like. The second converter may be provided with a basic, neutral, or acid lining, the former being preferred. The silicious material left in the first converter gradually settles as the white metal is being removed and finally rests upon the bottom of the converter. A new charge of matte is now introduced and the process is continued as before.

Example II: Using a single converter, silicious material and matte are introduced and air is blown through the mass as before. The slag is removed, more silicious material is added and a second blow is produced and this process is continued until white metal is produced. Instead of introducing fractional amounts of silicious material, the requisite amount may be introduced in one charge. The slag is removed from the white metal and the latter is now blown to blister copper. Immediately before the copper is poured, silicious material is placed in the converter. The copper is then poured or otherwise removed from below this material, after which a new charge of matte is introduced and the whole process is repeated.

It will be seen that in both examples I introduce silicious material into the converter and upon the bath or charge therein, which is inert or not affected chemically by the bath, but which is heated thereby. This obviously utilizes the heat of the bath which would otherwise be wasted. The heated silicious material is now brought into contact with molten matte of a second charge and tends to raise the temperature of the matte, whereas in previous processes the introduction of silicious material reduced the temperature of the matte and necessitated the blowing of air for a time to raise the temperature to its original point.

Another advantage of my process is that the slags poured from the converter are in general clean, containing but a small percentage of copper. It is well known to those versed in the art that slags poured from a bath either of white metal or of copper contain a large percentage of copper, those poured from a bath of copper containing much more copper than those poured from a bath of white metal and that they must be subsequently treated at great expense to obtain the copper content thereof.

In the operation of my process in any of its forms I at no time pour slag from a bath of copper, while in the operation of the specific example of my process in which two or more converters are used, I pour slags only from matte and at no time from either white metal or copper. The slag existing over the white metal is rendered stiff and viscous by the addition of suitable quantities of silicious material, with the result that the white metal can be poured from below without the use of complicated apparatus. This thick, viscous slag containing appreciable amounts of copper is retained in the converter and worked up with the next charge of matte into a clean slag, containing negligible amounts of copper, which clean slag is finally poured from the matte. Thus it will be seen that my process, either obviates the necessity or reduces the expense of the subsequent treatment above mentioned.

After the blister copper has been produced, it is refined, usually in a reverberatory furnace. The slag obtained in this refining process is principally composed of a silicate of copper. I have found that this reverberatory slag may be used as silicious material in the above process of bessemerizing copper matte and the use of this slag constitutes an important part of my invention. Not only is the silicious content of the slag utilized for fluxing purposes, but the copper content is added to the bath.

Some difficulty has been encountered in the bessemerizing of copper matte according to well known processes because of the tendency of the bath to attain an excessively high temperature so that the lining is rapidly destroyed. I have found that when I use a converter the lining of which abuts tightly against the inner walls of the metallic converter shell, the temperature of the lining does not rise excessively owing to the excellent path for the conductivity of heat to the shell and the transmission of heat therefrom to the atmosphere. If, on the other hand, the basic or neutral lining is made very thick and especially if it is also insulated from the steel shell of the converter, the lining will attain the temperature of the charge; the latter must therefor be maintained at a yellow heat to insure a reasonably long life to the lining. I have also found that the temperature of the bath can be controlled by forcing varied quantities of steam under pressure, preferably superheated steam, with the air blast into the converter. I have found also that the temperature can be controlled by adding silicious material which contains copper such as reverberatory slag to the matte because the reaction between the copper oxide of said material and the matte produces a lowering of the temperature.

I have found that it is advantageous to operate the converters at a temperature corresponding to a cream-white color. If operated at a lower temperature, which corresponds to that of the slag when it presents a yellow appearance, it would be difficult to keep the twyers free from accretions without resorting to excessive use of the twyer rod, resulting in the rapid wearing away of the lining at the zone of the twyers and the increase of the blast pressure. If the bath is at a yellow heat, it may be quickly increased to a cream-white heat by the addition of carbonaceous matter, such as coal, preferably in an amount less than one per cent of the weight of the charge. This obviously results in a saving of power and in increased life of the lining especially at the zone of the twyers.

I have found that the temperature of the converter will be higher when the slag is low in silica than when it is high in silica. If the lining is thick and insulated from the steel shell, the bath must be kept at a yellow heat. If now no other means than charging silicious material into the converter is availed of for controlling the temperature, it will be found necessary to take a converter slag containing about 27% of silica. On the other hand, if the converter is lined with a thin lining of basic or neutral bricks of, for example, six to twelve inches in thickness, which are backed up tightly against the steel shell, the charge can be operated at a temperature higher than that of the lining, thus producing a slag low in silica and manifestly resulting in greater economies of operation. In this case the slag may contain 18% of silica or less, such a slag being greatly preferred over one containing 27% of silica because there is a smaller amount to handle and because it is more valuable as an iron flux for the blast furnace or smelting reverberatory furnace. Moreover, in order to bessemerize mattes higher than 60% in copper, the converter slag must not contain more than 20% of silica; otherwise the charge will be too cold to finish properly. It is ordinarily very difficult to bessemerize such high grade mattes which are poured into the converter at a low temperature, without the use of extraneous fuel. My process of preheating the silicious material, as described above, is therefore of especial importance when high grade mattes, which are low in fuel values, are being treated.

I claim:

1. The improvement in the art of bessemerizing matte which consists in introducing silicious material into a converter upon the molten charge therein, which material thus become heated but chemically remains unchanged, removing the charge from said material and utilizing said heated material as a fluxing medium for a subsequent charge of matte.

2. The improvement in the art of bessemerizing copper matte which consists in introducing silicious material into a converter upon the molten charge therein, in sufficient amount to form a thick, viscous mass upon said charge, removing the charge from the converter while allowing said mass to remain therein and introducing matte into the converter upon said mass.

3. The improvement in the art of bessemerizing copper matte which consists in reacting upon matte in the converter with a slag composed essentially of copper silicate.

In testimony whereof I have hereunto set my hand in the presence of two subscribing witnesses.

JAMES B. HERRESHOFF, Jr.

Witnesses:
JOHN A. FERGUSON,
FRANK F. KIRKPATRICK.